Sept. 13, 1966  M. I. GLASS ETAL  3,271,898
SOUND MAKING DEVICE
Filed Feb. 1, 1965
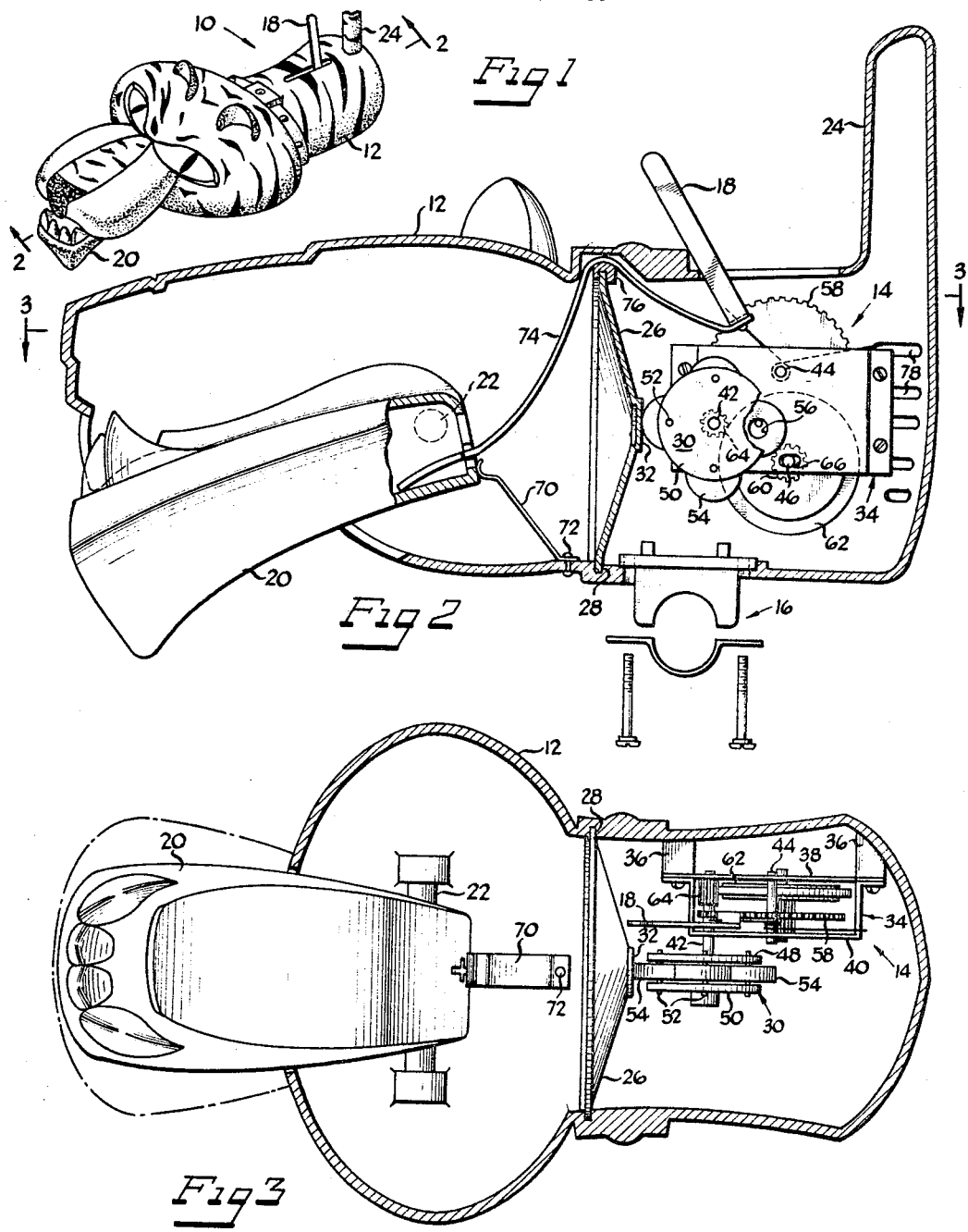
Inventors
MARVIN I. GLASS
BURTON C. MEYER
JEROME L. PINSLER
By James D. Coffee
Atty

United States Patent Office 3,271,898
Patented Sept. 13, 1966

3,271,898
SOUND MAKING DEVICE
Marvin I. Glass and Burton C. Meyer, Chicago, and Jerome L. Pinsler, Evanston, Ill., assignors to Marvin Glass & Associates, Chicago, Ill., a partnership
Filed Feb. 1, 1965, Ser. No. 429,340
1 Claim. (Cl. 46—118)

The present invention relates generally to a sound making device and is more particularly directed to a manually operable horn especially adapted for use on a vehicle such as a bicycle or the like.

The primary object of the present invention is to provide a sound making device which is manually operable, requires no electrical power, and is capable of producing and amplifying a sound which will be particularly attractive to children for use on bicycles, tricycles and the like. A more particular object of the invention is to provide a signal horn or warning device which uses a sounding diaphragm in conjunction with a plurality of movable striker elements, wherein the latter are rotated through a path or striking engagement with the diaphragm at varying speeds so as to produce noise or sound which varies in pitch and volume during operation of the horn. Other objects and advantages will be apparent in the following description of the selected embodiment in the invention as illustrated in the drawings wherein:

FIGURE 1 is a perspective view of a toy horn embodying the invention;

FIGURE 2 is an enlarged longitudinal sectional view of the horn with parts broken away and in section, and, FIGURE 3 is a sectional view taken along the line 3—3 in FIGURE 2.

As illustrated in the drawings, the selected embodiment comprises a toy horn 10 having a housing 12 simulating a tiger figure, and a sound making mechanism 14 within the horn is adapted to produce a growling noise such as may be associated with the tiger figure. The tiger figure is adapted to be mounted on the handle bars or the like of a vehicle, such as a bicycle, by means of a conventional clamping device 16. Projecting upwardly from the body of the tiger is a lever 18 which can be moved rearwardly to actuate the sound mechanism and also produce an opening and closing movement of the lower jaw 20 of the figure.

The horn housing 12 is preferably of plastic, but may be of other suitable material, with the interior of the housing being generally hollow to receive the sound making mechanism 14. The lower jaw 20 of the tiger is a relatively movable part which is pivoted to the main housing for movement about a generally horizontal axis defined by a transverse shaft 22. The rearward portion of the housing includes a vertically extending tail 24 providing a stationary support for the hand of the operator as the lever 18 is grasped and moved rearwardly to actuate the sound making device. As will be seen later in the description, the sound making device 14 is in part a free running mechanism, so that the lever can be moved rearwardly in rapid succession to produce a greater volume and higher pitch as well as greater speed and a longer period of operation for the horn.

The sound mechanism within the horn body comprises a generally frusto-conical diaphragm 26 fixed in position by means of a recess 28 formed in the interior wall of the housing, and a striker assembly 30 which is disposed immediately rearwardly of a center flat portion 32 of the diaphragm. The striker assembly is carried by a frame 34 which is supported by suitable means, such as a pair of bosses or brackets 36 projecting inwardly from one side of the wall and preferably formed integrally therewith. The frame structure 34 includes a pair of spaced apart plate members 38 and 40, preferably of metal, having aligned openings therethrough to rotatably support three shafts 42, 44 and 46, respetcively. The forward shaft 42 has mounted on one end thereof the striker assembly 30 which includes a pair of circular plates 48 and 50 disposed in relatively fixed, spaced apart relation by four pins 52. Each of these pins carries a circular striking element 54 which is rotatably mounted on the supporting pin 52 by a centrally enlarged opening 56. Consequently, each striker is rotatable relative to the supporting plates and is also shiftable relatively to its supporting pin 52. The gear drive mechanism for effecting rotation of the striker assembly includes a main drive gear 58 rotatable about the axis of its supporting shaft 44, a pinion gear 60 on the shaft 46 which also carries a large friction drive wheel 62, and a spur gear 64 mounted on the inner end of the striker assembly shaft 42. The lever 18 is fixed to the main drive gear 58 so that rearward movement of the lever effects rotation of the main drive gear, which motion is transmitted through the pinion gear 60 and then through the friction drive wheel 62 to the pinion 64 fixed on the striker assembly shaft 42. It will be noted that the shaft 46 supporting the friction wheel 62 and the pinion 60 is journaled at its opposite ends in a pair of aligned elongated slots 66 formed in the metal plates 38 and 40. The shifting arrangement thereby provided for the shaft 46 affords a free running arrangement for the striker assembly after the main drive gear 58 has stopped its motion through release of the hand lever 18. Such disengagement of the main drive gear 58 from the pinion 60 permits the striker assembly 30 to function as a fly wheel and continue operation of the horn until such fly wheel stops rotating. More particularly, in the operation of the horn the hand lever 18 is pulled rearwardly by squeezing the lever against the vertically extending tail portion 24 of the housing and such rearward movement effects clockwise rotation of the main drive gear 58. The initial movement of the main drive gear causes the pinion 60 and its associated shaft 46 and friction wheel 62 to move forwardly in the slots, with wheel 62 pressing against the spur gear 64 on the striker assembly shaft. Preferably, wheel 62 is provided with a rubber or other resilient material about its periphery to provide maximum friction between the wheel and the teeth of gear 64. As wheel 62 rotates and moves into driving engagement with gear 64, the pinion 60 moves out of engagement with drive gear. 58 to provide a free running motion for the remainder of the drive mechanism and the striker assembly 30 on shaft 42. The rotation of the striker assembly, which rotates in a clockwise manner, causes each of the striker elements 54, in sequence, to strike against the flat central section 32 of the sounding diaphragm 26. Due to intertia, the rotation of the striker assembly diminishes in speed as it continues to rotate, and such reduction in speed effects the timing of the striking engagement of the striker elements 54 against the diaphragm resulting in a change in the pitch of the sound produced. Consequently, it is seen that the striker assembly serves as a fly wheel in maintaining the operation of the striker mechanism after the drive gear is disengaged. Of course, the drive gear 58 can be re-engaged with the pinion 60 as the speed of rotation of the shaft 46 diminishes and the latter moves rearwardly in the slot 66 to a position permitting reenagagement between the drive gear and the pinion. Repeated operation of the lever 18 in quick succession will produce rapid changes in speed of operation of the sound mechanism with accompanying changes in pitch so as to simulate the growling of a tiger.

Looking now to the illustrated tiger head, it will be noted that the lower jaw 20 of the figure is biased into a closed position by means of a leaf spring 70 fixed at one end to the interior of housing 12, by rivet 72, and having its other end pressed against the rearward portion of the jaw. A flexible strap 74 is fixed at one end on the lever 18 and passes over the upper edge of an arcuate rib 76 providing the upper part of recess 28 holding diaphragm 26 for attachment with the jaw forming part 20. Consequently, as the lever 18 is operated the jaw 20 opens and closes to provide a more realistic visual effect and also to assist in varying the pitch and volume of the sound produced by changing the character of the sounding chamber provided by the interior of housing 12. In this respect, it will be noted that in the illustrated embodiment essentially the entire housing 12 serves as a sound box, and the rearward portion of the housing is preferably slotted as indicated at 78 to provide for emitting of the sound to the rear as well as through the opening defined by the mouth at the front part of the figure.

Although shown and described with respect to particular apparatus it will be apparent that various modifications may be made without departing from the principles of this invention.

What is claimed is:

A toy horn comprising an animal figure head defined by an elongated housing having a generally hollow interior, a jaw portion of said head being mounted on the housing for movement relative thereto, sound producing mechanism including a generally frusto-conically shaped diaphragm fixed in transverse relation within said housing rearwardly of said movable jaw portion, said diaphragm having a flat, central section, a striker support means journaled in said housing for rotation relative thereto, a plurality of striker elements carried by said support means in circumferentially spaced relation about the periphery thereof for movement through a path of striking engagement with the flat central section of the diaphragm, each of said striker elements being circular in form and being loosely mounted on the support by means of a pin on the support and an enlarged central opening in the striker, whereby said striker may rotate and also shift radially of said pin, gear drive mechanism in said housing including a main drive gear mounted on a first shaft, a friction drive wheel fixedly mounted on a second shaft, means including an additional gear on said second shaft for placing said drive gear in driving relation with said second shaft and friction drive wheel and also providing for disengaging said main drive gear from said driving relation with said additional gear, means connecting said friction drive wheel with said striker support for effecting rotation of said striker support in response to rotation of said friction wheel, a lever fixed to said main drive gear and projecting from said housing to provide means for manually rotating said main gear, and means connecting said lever with said movable jaw portion to move the latter as said main drive gear is actuated to cause said striker elements to engage said diaphragm.

References Cited by the Examiner

UNITED STATES PATENTS

| 979,061 | 12/1910 | Codd | 116—143 |
| 1,180,524 | 4/1916 | Overholt | 116—143 |
| 1,416,452 | 5/1922 | Cowey | 116—143 X |
| 3,160,984 | 12/1964 | Ryan | 46—232 |
| 3,200,537 | 8/1965 | Glass et al. | 46—118 |

FOREIGN PATENTS

| 1,043,423 | 6/1953 | France. |

LOUIS J. CAPOZI, *Primary Examiner.*